(12) United States Patent
Markegard et al.

(10) Patent No.: US 6,199,415 B1
(45) Date of Patent: Mar. 13, 2001

(54) ANTI-THEFT STEERING WHEEL BLOCKING LOCK

(75) Inventors: Harvey Keith Markegard; Joseph Michael Higgins, both of Billings, MT (US)

(73) Assignee: Blockit & Lockit Systems, Billings, MT (US)

(*) Notice: Subject to any disclaimer, the term of this patent is extended or adjusted under 35 U.S.C. 154(b) by 0 days.

(21) Appl. No.: 09/350,644

(22) Filed: Jul. 9, 1999

(51) Int. Cl.[7] .................................................. B60R 25/02
(52) U.S. Cl. .............................. 70/209; 70/226; 70/237; 70/DIG. 49
(58) Field of Search ........................... 70/209–212, 225, 70/226, 237, 238, DIG. 49

(56) References Cited

U.S. PATENT DOCUMENTS

| | | | |
|---|---|---|---|
| D. 365,774 | * 1/1996 | Collins et al. | D10/104 |
| D. 411,821 | * 7/1999 | Markegard et al. | D12/177 |
| 4,959,981 | * 10/1990 | Davidson | 70/238 |
| 5,469,135 | * 11/1995 | Solow | 70/209 X |
| 5,540,067 | 7/1996 | Kim | 70/209 |
| 5,598,725 | * 2/1997 | Chang | 70/209 |
| 5,619,872 | * 4/1997 | McCarthy | 70/209 |
| 5,619,873 | * 4/1997 | Wood | 70/209 |
| 5,636,537 | * 6/1997 | Chen | 70/209 |
| 5,636,538 | * 6/1997 | Openiano | 70/226 X |
| 5,666,832 | 9/1997 | Cunningham | 70/209 |
| 5,676,000 | * 10/1997 | Chen | 70/209 |
| 5,676,001 | 10/1997 | Ho | 70/209 |
| 5,678,433 | * 10/1997 | Riccitelli | 70/209 |
| 5,678,434 | * 10/1997 | Kuo et al. | 70/209 |
| 5,706,681 | 1/1998 | Gorokhovsky | 70/209 |
| 5,735,149 | 4/1998 | Winner, Jr. | 70/209 |
| 5,755,124 | * 5/1998 | Chang | 70/209 |
| 5,782,116 | * 7/1998 | Ryan et al. | 70/209 |
| 5,842,360 | * 12/1998 | Somerfield | 70/209 |
| 5,868,016 | * 2/1999 | Duran, Sr. | 70/226 X |
| 5,887,464 | * 3/1999 | Perez | 70/209 |
| 5,906,122 | * 5/1999 | Jinn-Fu | 70/209 |
| 5,992,190 | * 11/1999 | Townsend | 70/209 |

* cited by examiner

Primary Examiner—Suzanne Dino Barrett
(74) Attorney, Agent, or Firm—Rick Martin; Patent Law Offices of Rick Martin, P.C.

(57) ABSTRACT

A motor vehicle security device for protecting against the cutting and/or turning of an automobile steering wheel which includes a pair of clam shell halves made of cut-resistant material for covering the steering wheel rim and an anti-rotation arm. The clam shells radially and circumferentially overlies the steering wheel rim to limit access to the rim and protect against cutting of the rim. Second and third layer motion detector, siren and lights all having a battery and a backup power source are housed in the center of the clam shells.

10 Claims, 8 Drawing Sheets

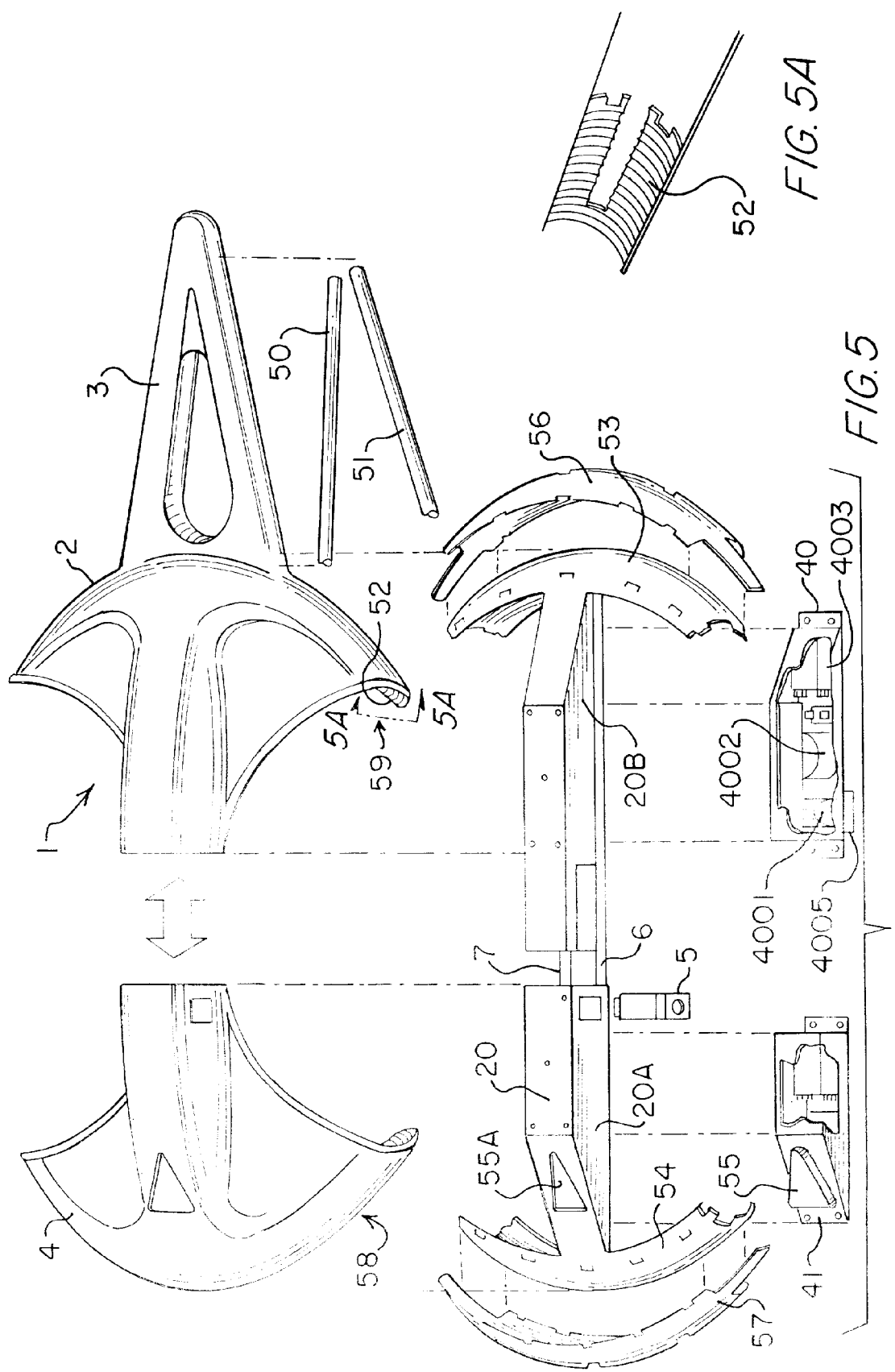

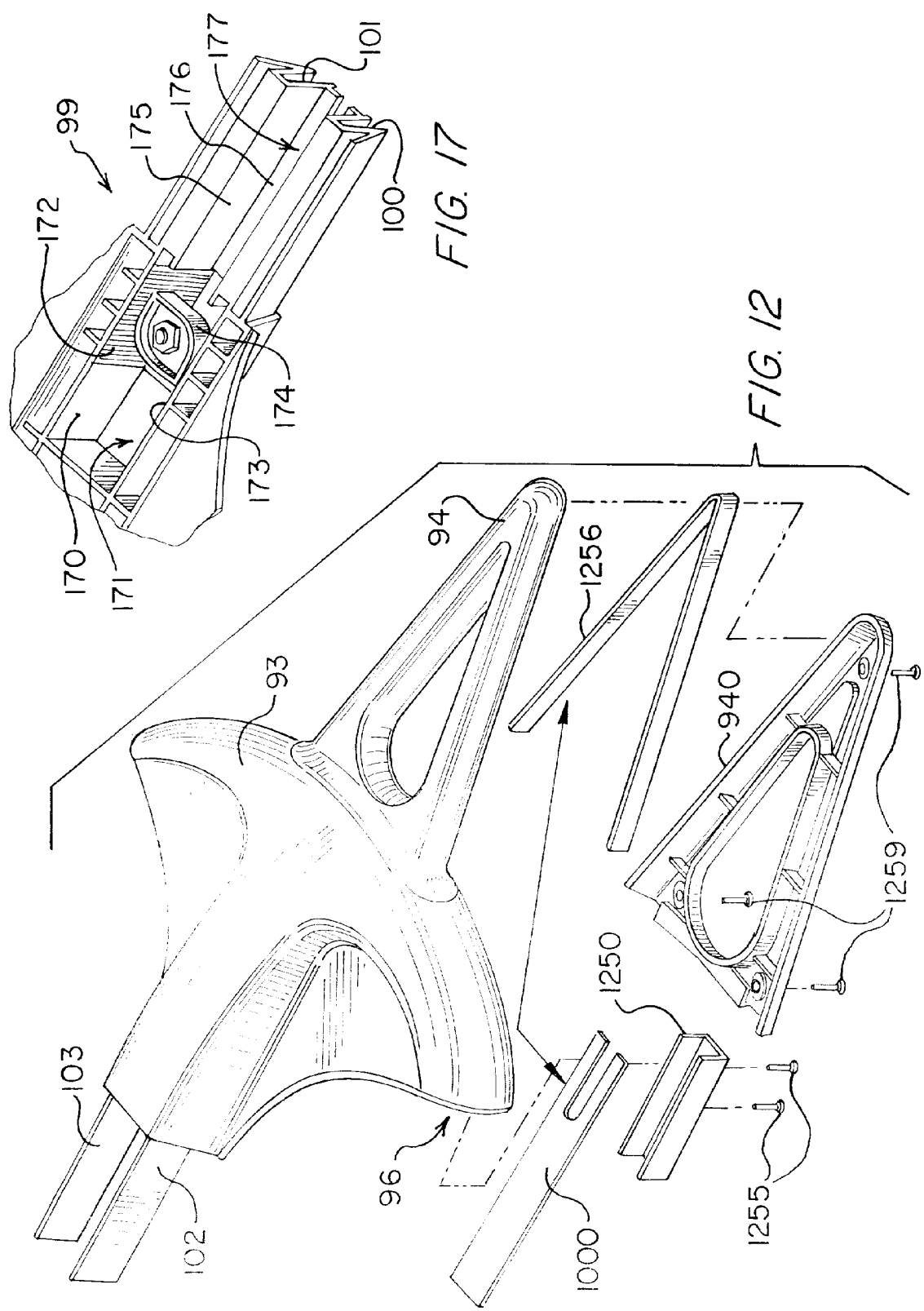

ANTI-THEFT STEERING WHEEL BLOCKING LOCK

FIELD OF INVENTION

The present invention relates to anti-rotation steering wheel covers which house a state-of-the-art battery operated motion detector having audio and visual alarms.

BACKGROUND OF THE INVENTION

Car theft is a thriving international business. Known in the art to deter theft are electronic motion detectors which trigger a 130 db siren inside the car engine compartment as well as flashes the car lights. Also known in the art are anti-rotation and steering wheel vandalism protection systems. The closest known prior art is U.S. Pat. No. 5,735,149 (1998) to Winner, Jr. Winner, Jr. teaches the use of two centrally connected pie-shaped plates to cover about ⅗'s of the steering wheel. The plates are cut-resistant and further support an anti-rotation handle which is designed to abut the windshield or other car interior structures. The anti-rotation handle secures the two plates to the steering wheel, however, since the plates rotate around a rivet 80 (col. 8, line 26), only one size steering wheel can be accommodated by one pair of plates. Therefore, a costly line of various sized plates are needed to meet the markets' demands.

Additionally, no layered security system is disclosed by Winner, Jr. He only teaches a single layer mechanical security system. Also known in the art is a "S.W.A.T." motion detector device which offers a 130 db alarm siren, see U.S. Design Pat. No. D365774. The present invention offers substantial new, useful and non-obvious features over Winner, Jr. First the present invention offers a variable width steering wheel lock. Second the present invention offers two extra layers of built-in security, a 130 db siren, plus a flashing strobe light. All these electronics run on a disposable battery. This device automatically arms and rearms itself after a pre-set period of approximately four minutes. Below follows a summary of related art.

U.S. Pat. No. 5,706,681 (1998) to Gorokhovsky discloses an anti-theft locking device which has a steering wheel engaging member 30, an end wall 32 covering the steering wheel 12, a peripheral wall 33 extending over at least a part of the outer periphery of a rim 14 of the steering wheel. According to Gorokhovsky, any attempt made within a reasonably short time to make the vehicle driveable will fail because it is not possible to cut or break rim 14 and ribs 16, 18 that are covered by end wall 32 and peripheral wall 33 of the steering wheel engaging member 30 [column 5, lines 45+]. Further, the rim 14 cannot be turned relative to the steering wheel engaging member 30 because stops 34 would interfere with one of the ribs 16, 18. The entire device cannot be turned because of engagement between stop member 24 and dashboard 26.

U.S. Pat. No. 5,676,001 (1997) to Ho discloses an anti-theft device for a vehicle which includes a casing covering over 200° of the wheel engaged onto a steering wheel of a vehicle for preventing the steering wheel form being rotated and for protecting the air bag from being stolen.

U.S. Pat No. 5,666,832 (1997) to Cunningham discloses an anti-theft device for an automobile steering wheel. Specifically, Cunningham discloses the use of two sleeve halves forming a housing to prevent cutting of the wheel. A locking bar(s) is also provided.

U.S. Pat. No. 5,540,067 (1996) to Kim discloses an anti-theft device for automobiles and airbags. Kim discloses the use of hub to protect the wheel and airbag from theft. Kim discloses that the lip of the cover spans at least 120°, but preferably 180°, around the wheel [Column 2, lines 35+]. A clamshell embodiment is shown in FIGS. 3–6. An electronic alarm is taught as well.

SUMMARY OF THE INVENTION

The primary aspect of the present invention is to provide a multi-layer security system for a car's steering wheel including a first mechanical layer to prevent theft of the car and/or vandalism to the wheel, a second electronic motion detector siren level, a third motion detector strobe light level, a fourth power backup level, and a fifth level of lock activated L.E.D. warning lights.

Other aspects of this invention will appear from the following description and appended claims, reference being made to the accompanying drawings forming a part of this specification wherein like reference characters designate corresponding parts in the several views.

The present invention provides:
Layered Protection
Mechanical Protection
Electronic Protection
Visual Protection
Audio Protection
Mechanical Protection
Adjustable width fits the steering wheel of Automobiles, light trucks, SUV's and boats.
Easily installed.
Easily removed.
Locks in place "without" use of key.
Cylinder deadbolt lock has millions of combinations.
Design wraps around "top-side-backside" of steering wheel.
Two clamshell sections cover 200 minimum degrees of steering wheel.
Carrying handle projects from the right clamshell main body.
Carrying handle prevents steering wheel rotation (coming in contact with windshield, "A" pillar, driver's door or driver's seat).
Design prevents air bag removal.
Constructed of space-age plastics and steel inserts which are cut-resistant and lightweight.
When in place of the steering wheel, product will not absorb heat from the sun, preventing heat damage to the steering wheel and air bag.
Electronic Protection
A single key activates L.E.D. visual warning system, a frequency siren, a strobe light, a motion detector, and locks the interlocking frame members together.
When the motion detector's tamper tolerance is exceeded, a strobe light flashes at pre-calculated intervals for a specified amount of time, and a second frequency siren sounds.
After reaching its specified amount of time, the strobe light and siren shut off and reset to an armed condition.
Continued tampering will repeat sequence.
Visual Protection
From three to seven key activated L.E.D. lights are user friendly for arming.
A down lighting strobe prevents easy covering up.
Audio Protection
Variable frequency siren is down firing to prevent vandalism, and increase amplification by reflex action of the sound waves.
Other aspects of this invention will appear from the following description and appended claims, reference being made to the accompanying drawings forming a part of this specification wherein like reference characters designate corresponding parts in the several views.

BRIEF DESCRIPTION OF THE DRAWINGS

FIG. 5 is an exploded view of the embodiment shown in FIG. 1.

FIG. 5A is a blow up of member 52 taken along line 5A—5A of FIG. 5.

FIG. 12 is an exploded view of the right cradle sub-assembly of the steering wheel lock embodiment of FIG. 10.

FIG. 17 is a back perspective view of the receiver and locking cam assembly.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

Figure 1:
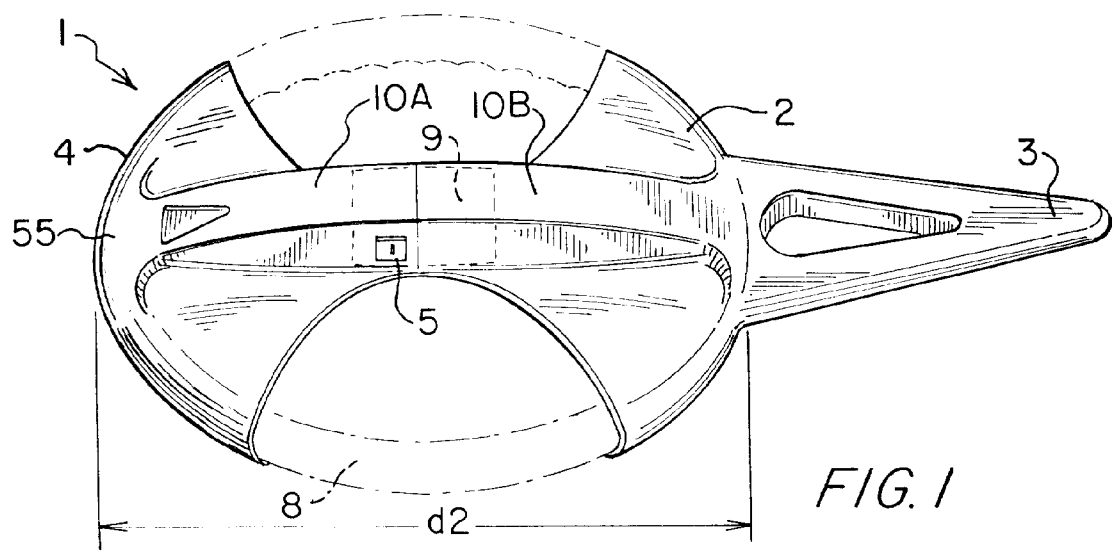
FIG. 1 is a front perspective view of the preferred embodiment in the closed position on a steering wheel shown in dots.

Referring first to FIG. 1 a steering wheel blocking lock 1 has a left clamshell 4, a right clamshell 2, which together cover about 200° of the steering wheel 8. The steering wheel 8 has an air bag compartment 9 which is covered by the central strut 10A, 10B. A cylinder lock 5 locks the clamshells 4,2 at a snug position around the steering wheel 8. The handle 3 is preferably made in the same plastic mold as right clamshell 2. The handle 3 prohibits turning of the steering wheel 8 by hitting the windshield or other car parts.

Figure 2:
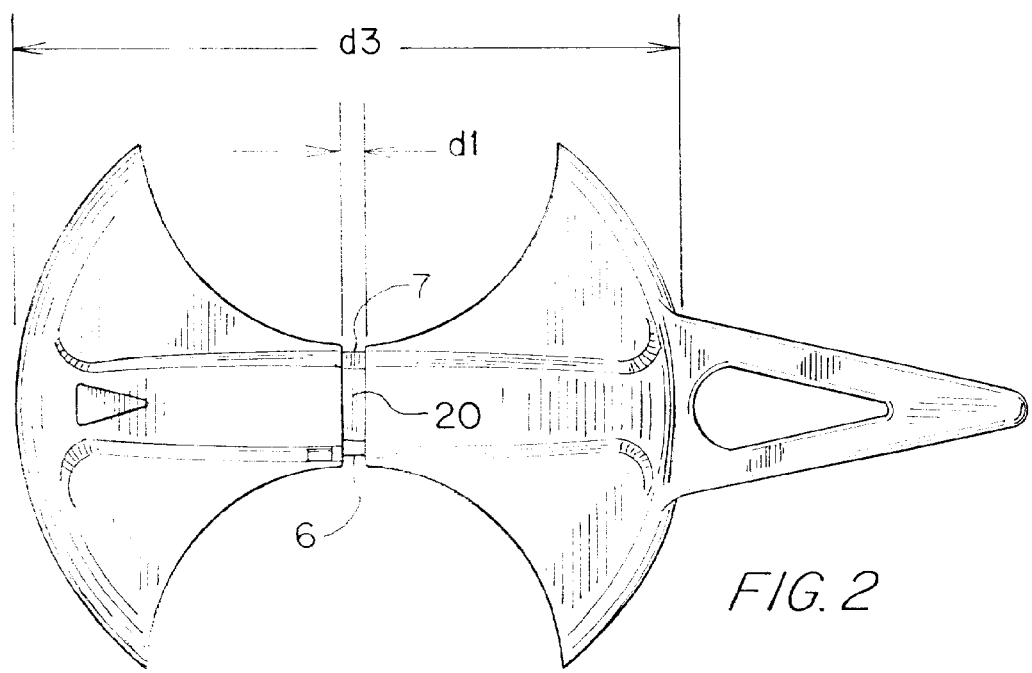
FIG. 2 is a front plan view of the embodiment shown in FIG. 1.

Referring next to FIG. 2 a frame 20 has tracks 6, 7 to enable the clamshells 4, 2 to have an adjustable width where nominal dimensions are $d_1=1"$, $d_2=15"$, and $d_3=17"$, a maximum width in the preferred embodiment. No limitations are expressed showing these nominal widths as one skilled in the art could make any size changes to the preferred embodiment.

Figure 3:
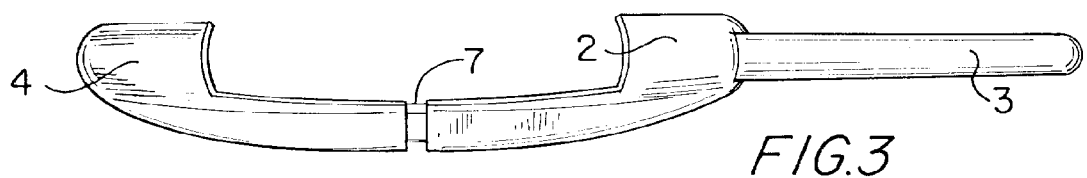
FIG. 3 is a top plan view of the embodiment shown in FIG. 1.

Referring next to FIG. 3 it can be seen that the arm 3 acts in a similar manner to "The Club"™ Made by Winner International to provide an anti-rotation function.

Figure 4:
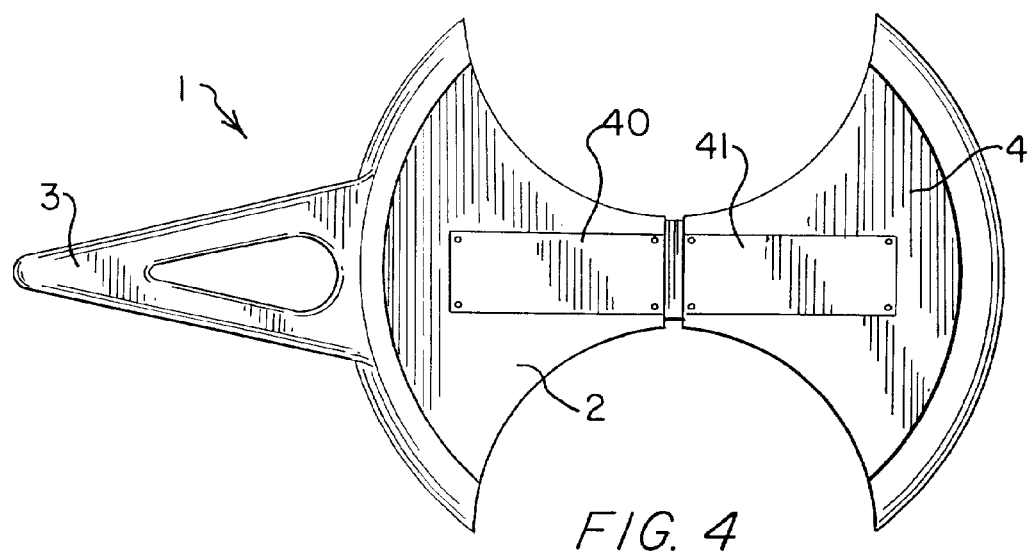
FIG. 4 is a back plan view of the embodiment shown in FIG. 1.

Referring next to FIG. 4 the siren/strobe sub-assembly 40 is seen screwed into the frame 20 as better seen in FIG. 5. The motion detector/lights sub-assembly 41 is also shown.

Referring next to FIG. 5 the steering wheel blocking lock 1 is built around a horizontal frame 20 having structural plastic inner looking frame members 20A, 20B. Tracks 6, 7 are preferably anti-theft metal rods to prevent hacksawing through the frame 20. Electronic sub-assemblies 40, 41 fit inside the frame 20. Frame members 20A, 20B extend distally into steering wheel cuffs 54, 53 which have a special ribbed interior surface 52 to help prevent the steering wheel blocking lock 1 from being rotated around the steering wheel 8 anti-theft metal guards 56, 57 snap over the cuffs 53, 54 to prevent hacksawing through the clamshells 2, 4 which are preferably made of resin. Anti-theft rods 50, 51 as inserted into the handle 3 from the interior to prevent hacksawing of the handle 3.

The L.E.D. sub-assembly 41 includes the clear red plastic cover 55 which fits into the frame 20's recess 55A. The L.E.D. array is visible from outside the locked car to show moving lights, thereby indicating an armed alarm system is on. The motion detector subassembly 40 has a separate battery 4003. It turns on the downward facing siren 4002 and downward facing strobe light 4001 when the motion detector is fired. A bottom surface strobe lense plate 4005 covers the strobe. A burglar might think coving the L.E.D. lights and cover 55 with duct tape will defeat the alarm, but the hidden siren and strobe will light up the car and make a great deal of noise.

The operation of the steering wheel lock is described below.

Installation

Pick up the steering wheel lock with handle pointed to the right (pointing to the interior of vehicle).

Left hand holds the left cradle.

Right hand holds the handle.

With equal pulling pressure from both hands; pull apart the Steering Wheel Blockit & Lockit until the opening between the two bottoms curved lips is wide enough to fit over the steering wheel.

Place Steering Wheel Blockit & Lockit on your steering wheel pushing the two sides together until snug against steering wheel.

Put key in lock, turn key to the on (armed) position and remove the key from the lock thereby; engaging the lock, activating the LED multi light visual warning system, engaging the tamper tolerance motion sensor, strobe light and siren, 30 second countdown to the activation program.

Tampering

When unauthorized entry of vehicle occurs, and assailant struggles with Steering Wheel Blockit & Lockit to initiate its removal from the steering wheel the following occur.

1) The motion sensor is set to an allowable tamper tolerance.
2) Once tamper tolerance is exceeded the steering wheel blocking lock activates its strobe light and variable frequency siren for 30 seconds.
3) The strobe light visual warning and alerting system flashes reflecting and refracting its light in a multitude of directions.
4) The frequency siren sounds and is refracted off the Steering Wheel, multiplying its reflected loudness.
5) After 30 seconds the alarm system shuts off and the tamper tolerance motion sensor resets itself to an armed condition.
6) Should assailant again struggle with steering wheel blocking lock to attempt its removal from the steering wheel the following reoccur.
7) Repeat steps 2,3,4,5.

Removal

Put key in lock, turn key to off position and remove the key thereby; unlocking the steering wheel blocking lock, deactivating the LED multi light warning system, the tamper tolerance sensor, the strobe light and the frequency siren.
Left hand holds the left cradle.
Right hand holds the handle extension.
With equal pulling pressure from both hands pull apart the steering wheel lock until the opening between the two bottom curved lips of the steering wheel lock is wide enough to allow removal of the steering wheel lock from the steering wheel.
Remove the steering wheel lock from the steering wheel.
Push the two sides together to close the steering wheel lock.
Place the steering wheel lock in its storage bag.

Referring to electrical drawing FIGS. 13–16, the electrical alarm logic and circuitry is described.

POWER UP

Closure of power switch SW1 Ref. (5.) applies power to K1 NO relay contract and Field Effect Transistor (FET) Q1. Resistor R1 and FET Q1 form a 0.25–2 microamp current source that slowly charges capacitor C1 to the threshold voltage (2–3VDC) of transistor Q2, a N Channel MOS enhancement type, over a 30 second period. Capacitor C1 is a low leakage current type. Until transistor Q2's gate voltage exceeds the threshold of 2–3 volts, transistor Q2 is held in a high impedance state disabling Tilt Switch SW2 from conducting current through latching relay coil K1 Set. This delays enabling the alarm giving the user time to exit the vehicle. N Channel MOS Transistor Q5 across C1 is in a high impedance state allowing the voltage across C1 to linearly increase.

AUTO RESET

Figure 14:
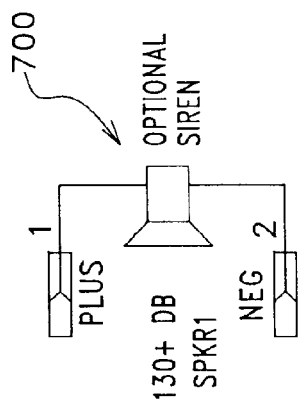
FIG. 14 is a circuit diagram of the siren and circuit.

If latching relay K1 was in a "SET" or "ON" state at the time key switch SW1 is closed power will be applied to the Siren (FIG. 15) and LED's (FIG. 14). Closure of key switch SW1 also (Ref. 5) quickly charges capacitor C2 through resistor R2. Resistor R2 and capacitor C2 values are selected for a time constant of 8–15 milliseconds. As capacitor C2 charges gate terminal of P Channel MOS Transistor Q3 is held near ground potential placing Q3 in a low impedance 'ON' state for a short time. Turning transistor Q3 "ON" allows current to flow into relay reset coil K1 reset switching the relay to the OFF state. Turning on Q3 to reset relay K1 also makes gate of N Channel MOS transistor Q5 positive turning "ON" Q5 and discharging capacitor C1 resetting the 30 second delay timer. Energizing the reset coil forces the relay to the "OFF" state, contacts K1 NO are open turning off the Siren (FIG. 15) and LED's (FIG. 14). Values of R1 and C1 are selected to give a 30 second delay for the user to exit the vehicle before C1 is fully charged.

If the relay was in the "OFF" or reset state contacts K1 NO2 would be open and no current would flow to the Siren (FIG. 14, 700) and LED's (FIG. 15, 800) saving power.

ALARM READY OR ARMED

After transistor Q3 has reset the relay K1 and capacitor C1 has charged above the gate threshold voltage of transistor Q2. The steering wheel lock electronic circuit is now ready for any would be intruder.

TAMPER

Figure 15:
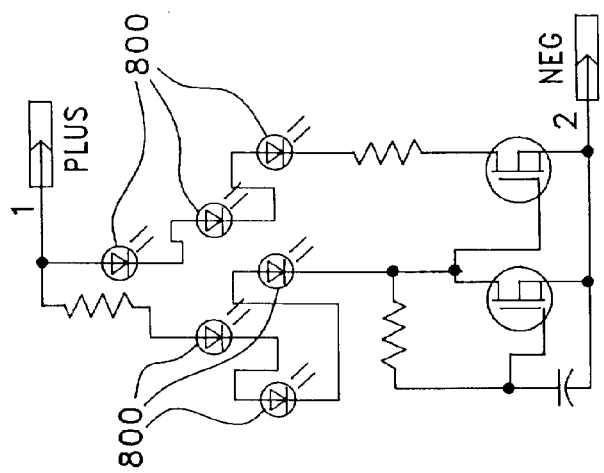
FIG. 15 is a circuit diagram of the L.E.D. array and circuit.
Figure 16:
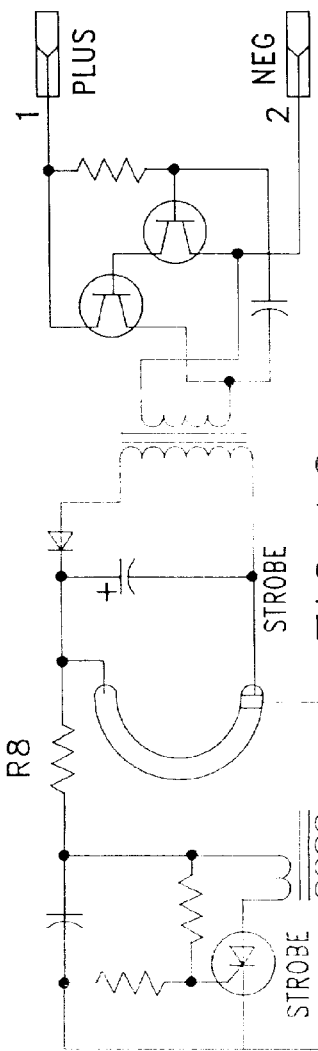
FIG. 16 is a circuit diagram of the strobe and circuit.
Figure 13:
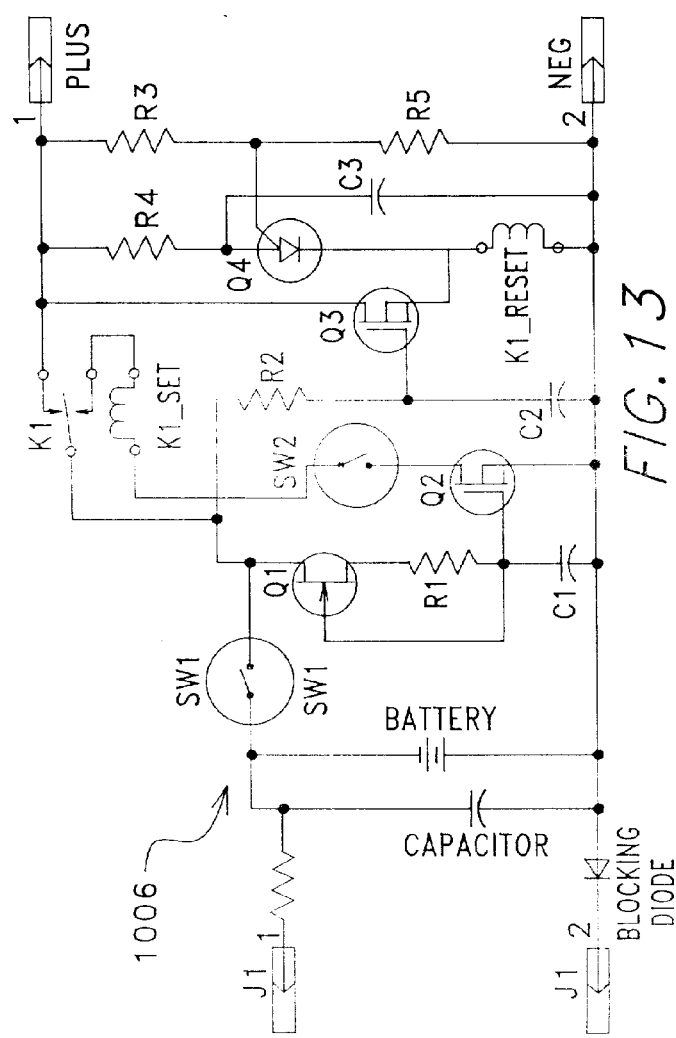
FIG. 13 is a circuit diagram of the motion detector circuit.

Closure of Tamper/Tilt switch SW2 (the motion detector) is series with Transistor Q2 allows current to flow through Relay Coil K1 Set closing relay contacts K1 No applying power to the siren, lights and strobe circuits FIGS. 14–16. With the closure of contacts K1 NO voltage is applied to Resistor network R4 and R5 also charging capacitor C3 through R3. Capacitor C3 is a low leakage type R3 is selected to charge C3 over a 30 second period. Programmable unijunction transistor PUT 1 trigger when the anode voltage rises to equal the gate voltage set by R4 and R5. Discharging capacitor C3 into Q4's anode and into coil K1 reset turning "OFF" or resetting the alarm. Application of power to the reset coil K1 reset turns on transistor Q5 discharging Capacitor C1. Placing the system in the power up state. If the Tilt switch is still closed the alarm will not trip until capacitor C1 charges turning "ON" transistor Q2. This cycle will repeat until the intruder gives up or the internal power source battery 1 or C4 is depleted.

POWER

The steering wheel blocking lock may be powered by a primary cell, rechargeable battery or multi-fared capacitor C4. Charging may be accomplished with a simple resistor R6 or a more complex charger appropriate for the type of battery selected.

Figure 6:
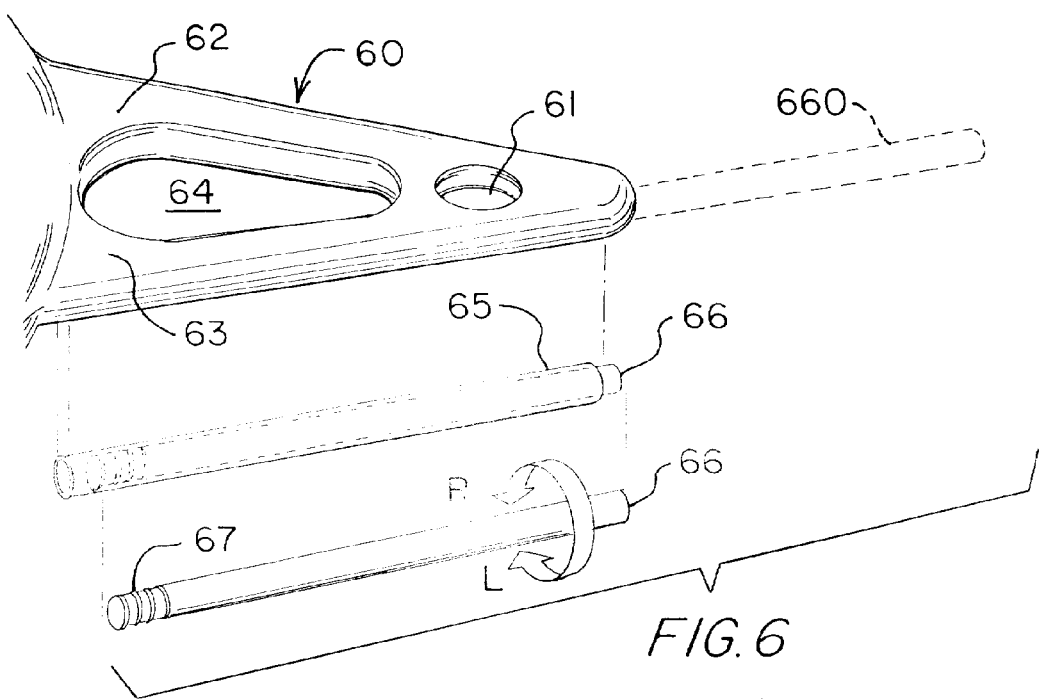
FIG. 6 is an exploded view of an alternate embodiment of the handle.

Referring next to FIG. 6 an alternate handle 60 is designed for boats, trucks, heavy equipment and the like. An extension rod 66 is housed in a sheath 65 in the lower arm 63 of the handle 60. It could be located in the upper arm 62, wherein upper and lower arms 62,63 form a hole 64. By turning extension rod 66 as indicated by arrows left L and right R, the threads 67 turn in the treads (not shown) on the inside of the sheath 65 so that the handle extends nominally about seven inches as shown by dots 660. Preferably the extension rod is made of hardened steel. A personalized logo are 61 is set into the handle 60.

Figure 7:
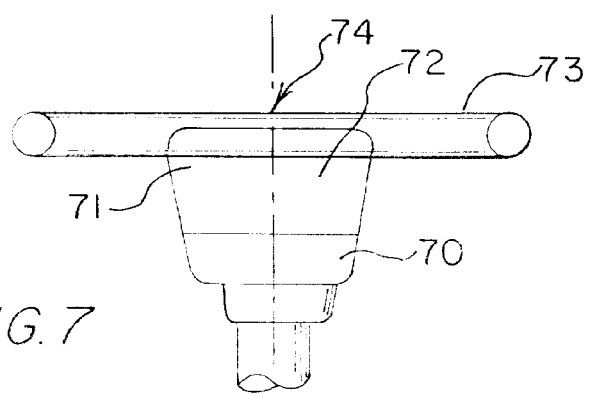
FIG. 7 is a top plan view of a typical steering wheel column having an airbag.

Referring next to FIG. 7 a steering wheel column 70 has an airbag compartment 71 with an airbag 72. The airbag compartment 71 protrudes from the center 74 of steering wheel 73.

Figure 8:
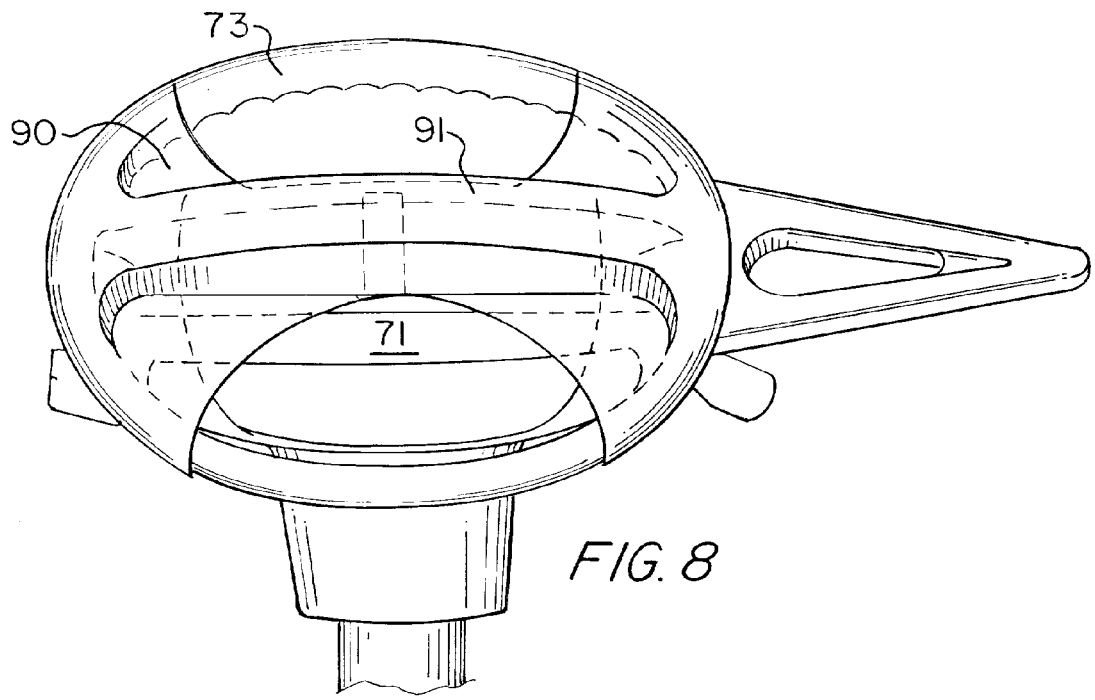
FIG. 8 is a front perspective view of the steering wheel column of FIG 7 protected by the steering wheel lock of FIG. 1.

Referring next to FIG. 8 a 15 inch steering wheel 73 is shown with the airbag compartment 71 protected by a steering wheel lock 90 and its central bar 91.

Figure 9:
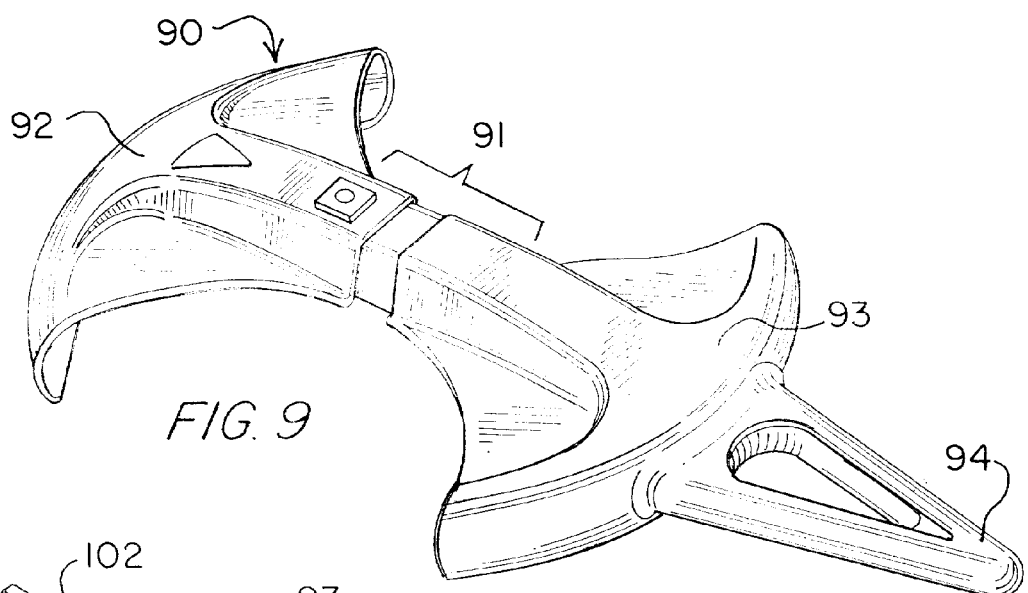
FIG. 9 is a top perspective view of an alternate embodiment steering wheel lock.

Referring next to FIG. 9 the steering wheel lock 90 has a left cradle sub assembly 92, a right cradle sub assembly 93, a hub assembly 91 and a handle 94. The two cradle sub assemblies cover about 200 degrees of the steering wheel and are preferably made of space age plastic.

Figure 10:
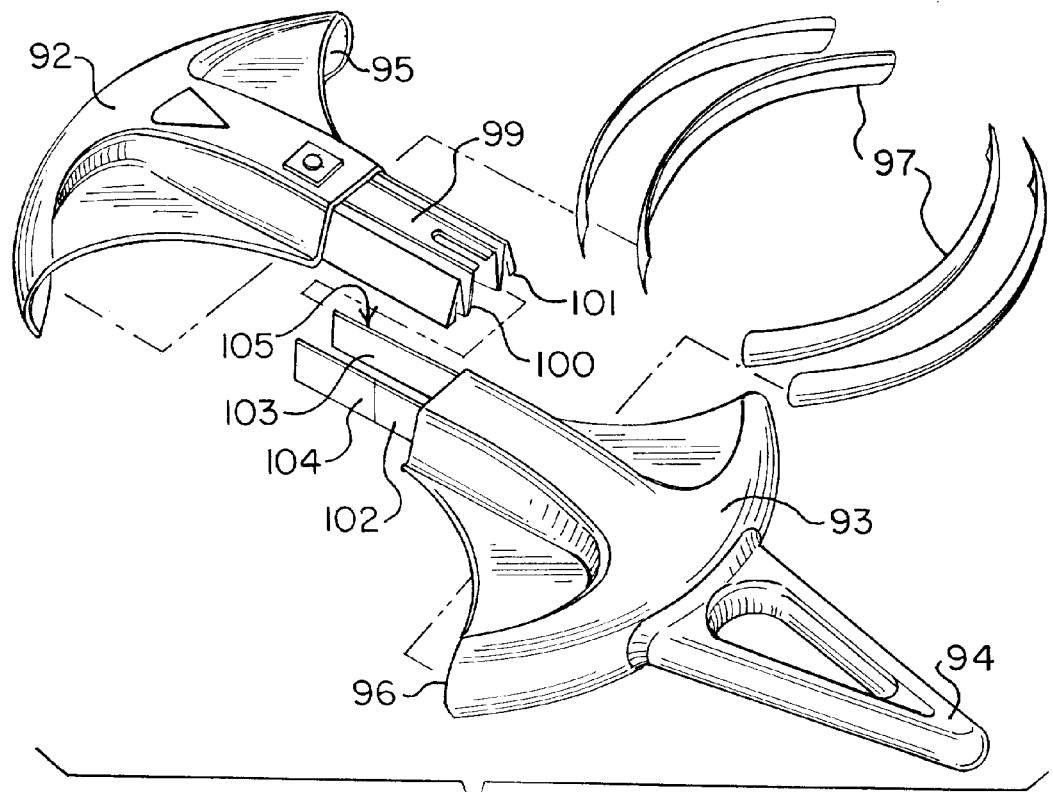
FIG. 10 is an exploded view of the steering wheel lock of embodiment of FIG. 9.

Referring next to FIG. 10 a friction pad 97 and metal plate 98 combination is provided in each lip 95,96 of the respective cradle subassembly. Preferably the metal plates 98 are made of 16 gauge steel to prevent hack sawing therethrough. The left cradle subassembly 92 has a main beam receiver 99 also made preferably of plastic. The grooves 100,101 receive the plastic tongues 102, 103 of the right subassembly. Each tongue has an outlined facing set of locking ridges 104,105 which are seen in FIG. 17 to lock the two cradle subassemblies at a desired width. The inner walls 170, 171 of the receiver 99 also have locking ridge 172, 173 such that upon rotation of the cam 174 the tongues 102,103 are pressed against and lock with the inner walls 170,171 via the interlocking locking ridge 104,105 and 172,173.

Figure 11:
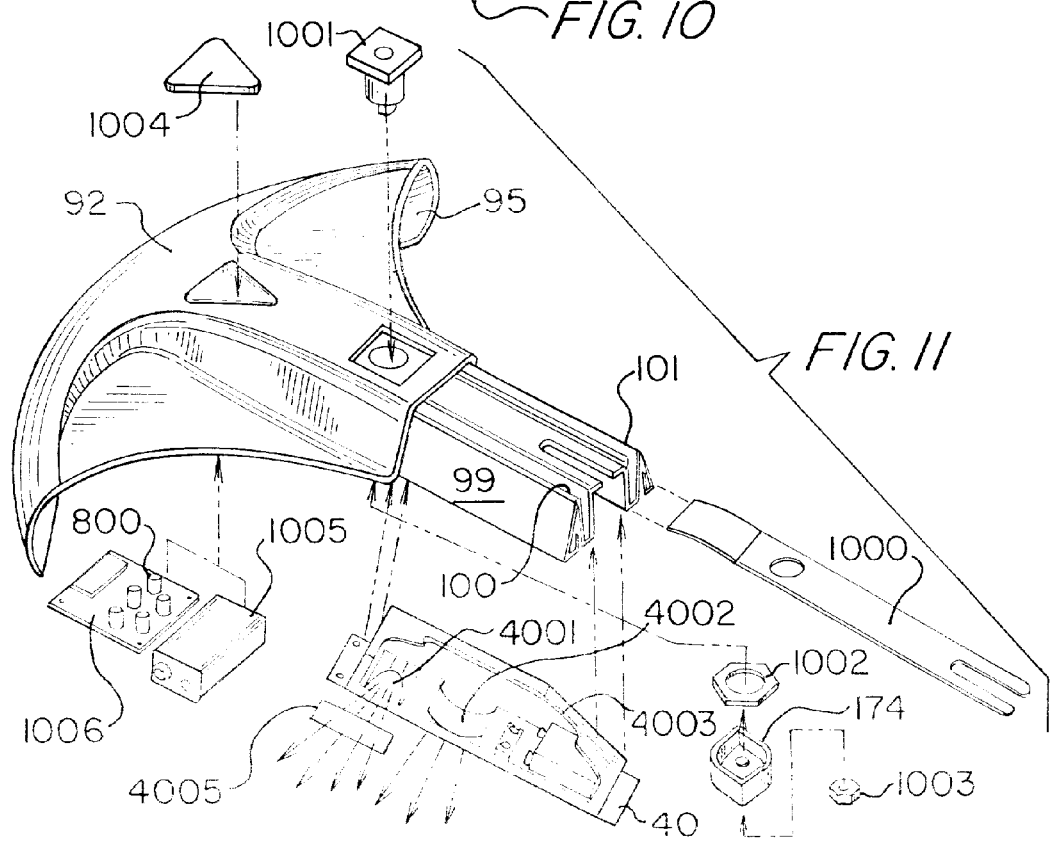
FIG. 11 is an exploded view of the left cradle sub-assembly of the steering wheel lock embodiment of FIG. 10.

Referring next to FIG. 11 a metal (preferably 16 gauge steel) safety plate 1000 fits into the receivor 99 to prevent hack sawing therethrough. The cam 174 is turned by the lock 1001 whose inner cylinder is rotated by a key (not shown). A lock retainer nut 1002 secures the lock, and a can retainer nut 1003 secures the can 174 to the lock. The electronic subassembly 40 is the same as that shown in FIG. 5.

A red lense 1004 covers the L.E.D. array 800 (shown in FIG. 15). A battery 1005 powers the motion detector circuit 1006 of FIG. 13.

Referring next to FIG. 12,18 the front and rear portions of the right cradle subassembly 93 are shown.

A bar guide 1250 guides the right cradle subassembly 93 into the receivor 99 via receivor walls 175,176,177 shown in FIG. 17. The bar guide is mounted into right cradle subassembly holes 181,182 with screws 1255 preferably self tapping.

The handle 94 has a rear cover 940 which secures a metal two prong plate 1256 (preferably made of 16 gauge steel) in the handle 94 to prevent hack sawing therethrough. Screws 1259 are preferably self tapping.

Figure 18:
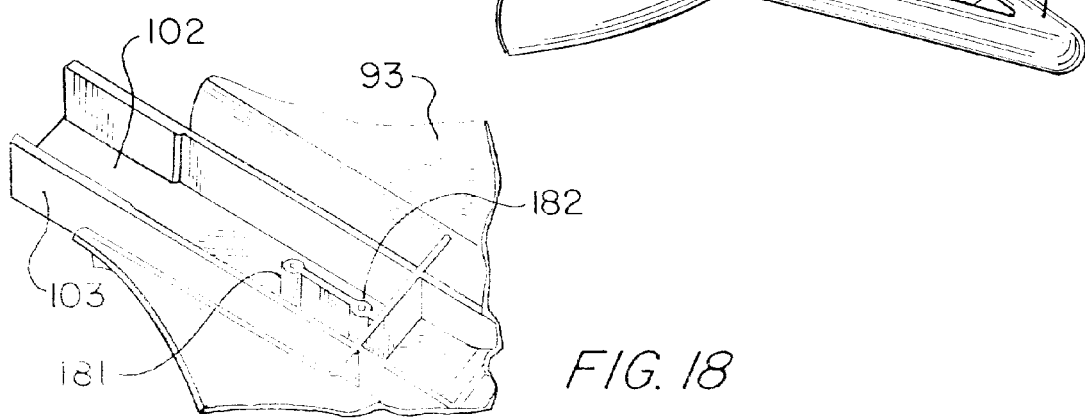
FIG. 18 is a back perspective view (reverse) of the right cradle assembly shown in FIG. 12.
Figure 19:
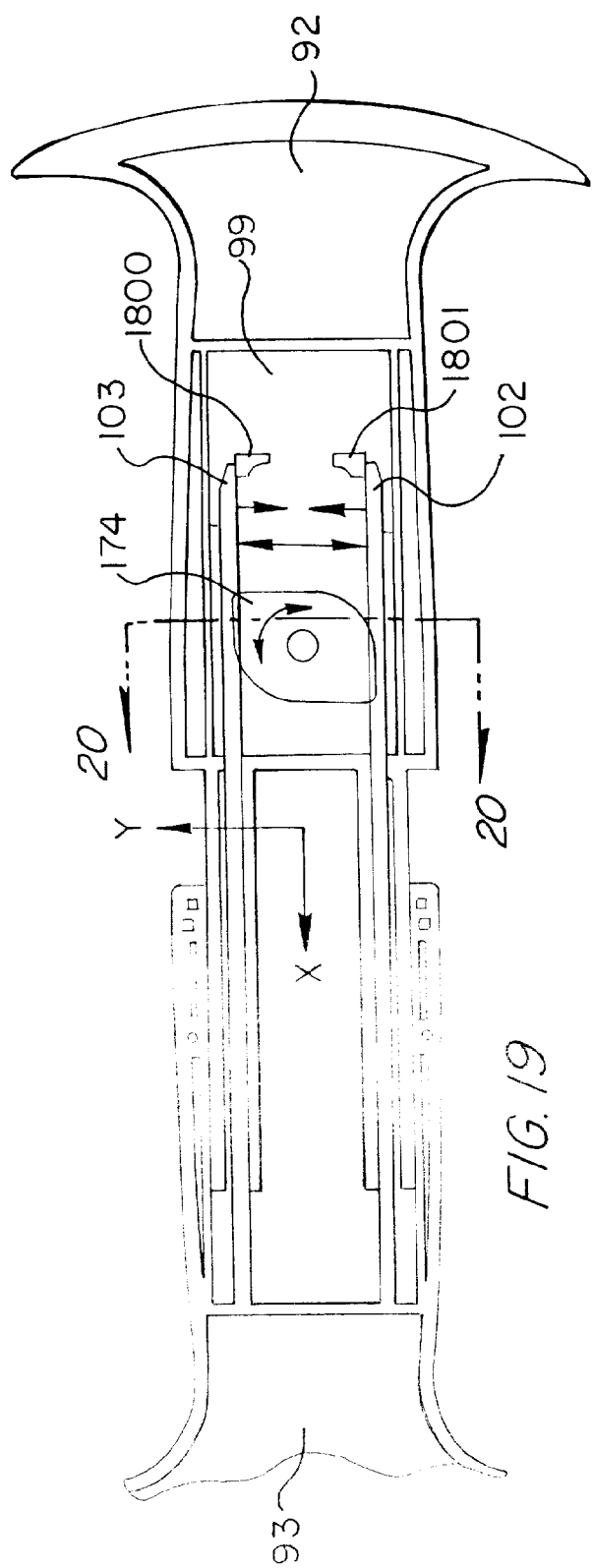
FIG. 19 is a back plan view of the wheel lock and cam locking subassembly assembled.
Figure 20:
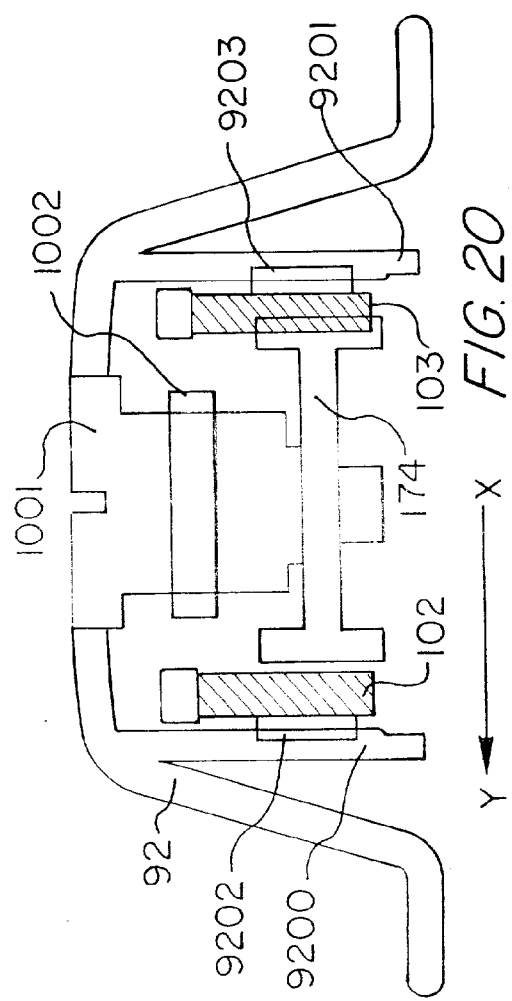
FIG. 20 is a cross sectional view through the middle of the cam locking subassembly taken along line 20—20 of FIG. 19.

Referring next to FIGS. 18,19 receivor walls which receive the tongues 102,103 are numbered 9200,9201. Wall 9200 has locking ridges 9202, and wall 9201 has locking ridges 9203. The tongues 102,103 have stops 1800, 1801 which come in contact with the cam 174 to prevent the cradles from falling apart from each other.

Although the present invention has been described with reference to preferred embodiments, numerous modifications and variations can be made and still the result will come within the scope of the invention. No limitation with respect to the specific embodiments disclosed herein is intended or should be inferred.

We claim:

1. A steering wheel lock comprising:
   a left cradle subassembly;
   a right cradle subassembly;
   a central bar formed by the joinder of said left and right cradle subassemblies;
   said central bar covering a central area of a steering wheel when mounted thereon;
   at least one of the left and right cradle subassemblies having an anti-rotation handle protruding therefrom;
   said central bar further comprising a variable width sliding mechanism and a lock therefor;
   said left and right cradle subassemblies together covering at least a 180° circumference of a 360° circumference of the steering wheel;
   an electronic alarm subassembly housed in the wheel lock; and
   wherein the electronic alarm subassembly further comprises a motion detector, a downward facing siren and a control circuit.

2. The apparatus of claim 1, wherein each of the left and right cradle subassemblies further comprises a peripheral lip for engagement to the steering wheel, said lips each housing an anti-cutting plate.

3. The apparatus of claim 1, wherein the handle further comprises an anti-cutting plate.

4. The apparatus of claim 3, wherein the handle further comprises an extension member.

5. The apparatus of claim 4, wherein the extension member further comprises a sheath and a threaded rod therein.

6. The apparatus of claim 1, wherein the central bar further comprises a left cradle receiver having slots affixed therein to receive at least one right cradle tongue.

7. The apparatus of claim 6, wherein the receiver further comprises a hollow to receive a bar guide from the right cradle, and a cam/lock assembly to lock the tongue at a desired position to provide a custom fit of the wheel lock to the steering wheel, said tongue having a stop to prevent said left and right subassemblies from separating.

8. A steering wheel lock comprising:
   a left cradle subassembly;
   a right cradle subassembly;
   a central bar formed by the joinder of said left and right cradle subassemblies;
   said central bar covering a central area of a steering wheel when mounted thereon;
   at least one of the left and right cradle subassemblies having an anti-rotation handle protruding therefrom;
   said central bar further comprising a variable width sliding mechanism and a lock therefor;
   said left and right cradle subassemblies together covering at least a 180° circumference of a 360° circumference of the steering wheel;
   an electronic alarm subassembly housed in the wheel lock; and
   wherein the electronic alarm subassembly further comprises a downward facing strobe light.

9. The apparatus of claim 8, wherein the electronic alarm subassembly further comprises an L.E.D. array and controller to light individual lights in the array when the control circuit is armed.

10. The apparatus of claim 8, wherein each of said left and right cradle subassemblies further comprise curved hemispherical lips large enough to only partially encircle a steering wheel, thereby enabling a fit over a plurality of various thickness steering wheels.

* * * * *